US011037193B1

(12) United States Patent
Mann et al.

(10) Patent No.: US 11,037,193 B1
(45) Date of Patent: Jun. 15, 2021

(54) CONTENT PRESENTATION BASED ON INFORMATION DETECTED IN REAL TIME (71) Applicant: Google LLC, Mountain View, CA (US)

(72) Inventors: Gideon S. Mann, New York, NY (US); Ameesh Makadia, New York, NY (US); Shanmugavelayutham Muthukrishnan, New York, NY (US)

(73) Assignee: Google LLC, Mountain View, CA (US)

( * ) Notice: Subject to any disclaimer, the term of this patent is extended or adjusted under 35 U.S.C. 154(b) by 81 days.

(21) Appl. No.: 16/398,916

(22) Filed: Apr. 30, 2019

Related U.S. Application Data (63) Continuation of application No. 14/624,072, filed on Feb. 17, 2015, now Pat. No. 10,296,943, which is a continuation of application No. 13/341,509, filed on Dec. 30, 2011, now Pat. No. 8,990,108.

(60) Provisional application No. 61/428,719, filed on Dec. 30, 2010.

(51) Int. Cl.
G06Q 30/02 (2012.01)
(52) U.S. Cl.
CPC ..... *G06Q 30/0251* (2013.01); *G06Q 30/0275* (2013.01)
(58) Field of Classification Search
None
See application file for complete search history.

(56) References Cited

U.S. PATENT DOCUMENTS

| 5,504,675 | A | 4/1996 | Cragun |
| 5,689,431 | A | 11/1997 | Rudow et al. |
| 5,724,521 | A | 3/1998 | Dedrick |
| 5,966,696 | A | 10/1999 | Giraud |
| 6,060,993 | A | 5/2000 | Cohen |
| 6,324,519 | B1 | 11/2001 | Eldering |
| 6,484,148 | B1 | 11/2002 | Boyd |
| 6,571,279 | B1 | 5/2003 | Herz et al. |
| RE39,470 | E | 1/2007 | Hylin et al. |
| 7,174,029 | B2 | 2/2007 | Agostonelli |
| 7,974,869 | B1 | 7/2011 | Sharma et al. |
| 8,489,112 | B2 | 7/2013 | Roeding et al. |
| 8,990,108 | B1 | 3/2015 | Mann et al. |
| 2002/0002525 | A1 | 1/2002 | Arai et al. |
| 2002/0049657 | A1 | 4/2002 | Main et al. |
| 2002/0184097 | A1 | 12/2002 | Hijiri et al. |
| 2003/0126013 | A1 | 7/2003 | Shand |
| 2003/0172376 | A1 | 9/2003 | Coffin, III |
| 2003/0216963 | A1 | 11/2003 | Ishiwaka et al. |

(Continued)

OTHER PUBLICATIONS

'Wikipedia' [online] "Vickrey Auction," 2011, [retrieved on Dec. 28, 2011]. Retrieved from Internet <URL: http://en.wikipedia.org/wiki/Vickrey_auction>. 4 pages.

*Primary Examiner* — Sujay Koneru
(74) *Attorney, Agent, or Firm* — Fish & Richardson P.C.

(57) ABSTRACT

A computer-implemented method for presenting content based on information detected in real time includes: receiving first information corresponding to detection of at least attendance at a physical location; selecting, in real time with the detection, at least one winning bid based on the first information, the at least one winning bid conditioned on the first information meeting an attendance criterion; and providing at least one winning content item associated with the selected winning bid to a content presentation device at the physical location.

20 Claims, 6 Drawing Sheets

(56) References Cited

U.S. PATENT DOCUMENTS

| | | |
|---|---|---|
| 2004/0194128 A1* | 9/2004 | McIntyre ............ G11B 27/034 |
| | | 725/32 |
| 2006/0087498 A1 | 4/2006 | Evemy et al. |
| 2006/0094409 A1 | 5/2006 | Inselberg |
| 2006/0212352 A1 | 9/2006 | Avissar |
| 2006/0233346 A1 | 10/2006 | McLlwaine et al. |
| 2006/0287913 A1 | 12/2006 | Baluja |
| 2008/0004953 A1* | 1/2008 | Ma .................... G06Q 30/0269 |
| | | 705/14.41 |
| 2008/0052219 A1 | 2/2008 | Sandholm et al. |
| 2008/0167943 A1* | 7/2008 | O'Neil .................. G06Q 30/02 |
| | | 705/7.34 |
| 2008/0167992 A1 | 7/2008 | Kokernak |
| 2008/0189168 A1 | 8/2008 | Kaplan |
| 2008/0244639 A1* | 10/2008 | Kaaz .................... H04H 60/33 |
| | | 725/34 |
| 2008/0294524 A1 | 11/2008 | Badros |
| 2009/0019472 A1* | 1/2009 | Cleland .................. G09F 27/00 |
| | | 725/34 |
| 2009/0063491 A1 | 3/2009 | Barclay et al. |
| 2009/0174658 A1* | 7/2009 | Blatchley .............. G06F 1/1601 |
| | | 345/158 |
| 2009/0197616 A1 | 8/2009 | Lewis et al. |
| 2010/0138290 A1* | 6/2010 | Zschocke ........... G06Q 30/0275 |
| | | 705/14.41 |
| 2010/0145809 A1 | 6/2010 | Knapp et al. |
| 2011/0145059 A1 | 6/2011 | Baluja |
| 2011/0178861 A1 | 7/2011 | Georgi |
| 2011/0223895 A1 | 9/2011 | Wagda et al. |
| 2011/0276392 A1 | 11/2011 | Vaver |
| 2011/0321087 A1* | 12/2011 | Huber .................... G06Q 40/04 |
| | | 725/34 |
| 2013/0031582 A1* | 1/2013 | Tinsman ............ H04N 21/4316 |
| | | 725/36 |

* cited by examiner

CONTENT PRESENTATION BASED ON INFORMATION DETECTED IN REAL TIME

CROSS-REFERENCE TO RELATED APPLICATION

This application is a continuation of and claims priority to U.S. application Ser. No. 14/624,072, filed Feb. 17, 2015, and entitled "Content Presentation Based on Information Detected in Real Time," which is a continuation of and claims priority to U.S. application Ser. No. 13/3412,509, filed Dec. 30, 2011, and entitled "Content Presentation Based on Information Detected in Real Time," which claims priority from U.S. provisional application 61/428,719, filed Dec. 30, 2010, and entitled "Systems and Methods for Gathering Data About Advertisement Presentation," the contents of which are incorporated herein by reference.

TECHNICAL FIELD

This document relates to systems and methods for presenting content based on information detected in real time.

BACKGROUND

Content can be presented in a variety of communication mediums such as billboards, radio, and television, to name just a few of many examples. Content providers sometime create one or more content items for each of its products or services to provide to audience members of a particular demographic. For example, ads can be selected for distribution in locations based on presumptive customers' interests or needs, and this allows advertisers to reach potential customers and increase their sales.

Several ways of distributing content exist. Advertisers can tailor their content for a suitable visual medium, such as television or billboards, to make it available to a defined group of viewers. As another example, audio ads can be presented on the radio or in a public place. Some publishers, such as TV or radio networks, enhance their business revenues by accepting selected ads for publication. Other publishers, such as billboard operators, display ads as the core line of business.

SUMMARY

In a first aspect, a computer-implemented method for presenting content based on information detected in real time includes: receiving first information corresponding to detection of at least attendance at a physical location; selecting, in real time with the detection, at least one winning bid based on the first information, the at least one winning bid conditioned on the first information meeting an attendance criterion; and providing at least one winning content item associated with the selected winning bid to a content presentation device at the physical location.

In a second aspect, a computer program product is tangibly embodied in a computer-readable storage medium and includes instructions that when executed by a processor perform a method for presenting content based on information detected in real time. The method includes: receiving first information corresponding to detection of at least attendance at a physical location; selecting, in real time with the detection, at least one winning bid based on the first information, the at least one winning bid conditioned on the first information meeting an attendance criterion; and providing at least one winning content item associated with the selected winning bid to a content presentation device at the physical location.

In a third aspect, a system includes: one or more processors; and a computer program product tangibly embodied in a computer-readable storage medium and comprising instructions that when executed by the one or more processors perform a method for presenting content based on information detected in real time. The method includes: receiving first information corresponding to detection of at least attendance at a physical location; selecting, in real time with the detection, at least one winning bid based on the first information, the at least one winning bid conditioned on the first information meeting an attendance criterion; and providing at least one winning content item associated with the selected winning bid to a content presentation device at the physical location.

Implementations can include any or all of the following features. Multiple detections are made at multiple physical locations, each physical location having at least one content presentation device and at least one perceptual device, and the method further includes using information from at least one of the perceptual devices to provide a content item for at least one corresponding content presentation device. At least a subset of the perceptual devices are organized in a sequence that includes at least some of the physical locations, and the method further includes detecting a local attendance peak at each of the subset of the perceptual devices; and causing content presentation at each of a subset of the content presentation devices, the content presentation being scheduled based on the detected local attendance peaks. At least one other physical location has a content presentation device and no perceptual device, and the at least one winning content item is provided also to the content presentation device at the other physical location. The winning bid has a first bid amount applicable when the attendance criterion is met, and at least one second bid amount applicable when the attendance criterion is not met.

The method further includes providing the first information to content providers in real time with the detection and before selecting the winning bid; and receiving, in real time with the detection and before selecting the winning bid, a realtime bid from at least one of the content providers, wherein the realtime bid is taken into account in selecting the winning bid.

The method further includes receiving second information corresponding to another detection done at the physical location while the winning content item is presented; and performing at least one action regarding the winning bid using the second information.

In a fourth aspect, a computer program product is tangibly embodied in a computer-readable storage medium and includes instructions that when executed by a processor perform a graphical user interface (GUI) for presenting realtime content item information. The GUI includes: a first area presenting a view of a geographic region, the view indicating at least one physical content location in the geographic region; a second area presenting information corresponding to detection of at least attendance at the physical ad location; and a third area configured for a content provider to submit a bid for content presentation at the physical ad location. Implementations can include any or all of the following features. The second area presents attendance history for the physical content location. The second area presents current attendance for the physical content location in real time.

Implementations can provide any or all of the following advantages. Content presentation can be improved by detecting the actual number of individuals present at the content presentation. An online two-sided auction enables fine grained measurement of the number of audience members and engagement of the audience directly in pricing and matching ads in real time. Advertiser bidding can be made more flexible using realtime parameters. Sales of ad slots to advertisers can be enhanced by the ability to charge the advertiser based on the actual viewers or listeners. The process of charging advertisers for ad distribution can be improved.

The details of one or more implementations are set forth in the accompanying drawings and the description below. Other features and advantages will be apparent from the description and drawings, and from the claims.

DETAILED DESCRIPTION

This document describes examples of content item presentations based on information detected in real time. For example, an advertiser's bid for showing an ad can be conditioned on the presence of at least a minimum number of people within a viewing area of the display screen, as detected in real time, such as by computer vision or other device perception. That is, if at least the minimum number of people is detected as currently being present near an ad billboard, then the bid is valid, and the ad will be presented if the bid is selected as a winning bid. As another example, the price payable by the advertiser can depend on the number of viewers detected to be present while the ad is being presented. While ads are sometimes used herein as examples of content, other types of content can be used. Also, while displaying ads or other content is used in examples herein, it will be understood that ads or other content can be presented in other ways, for example by audio playback.

Figure 1:
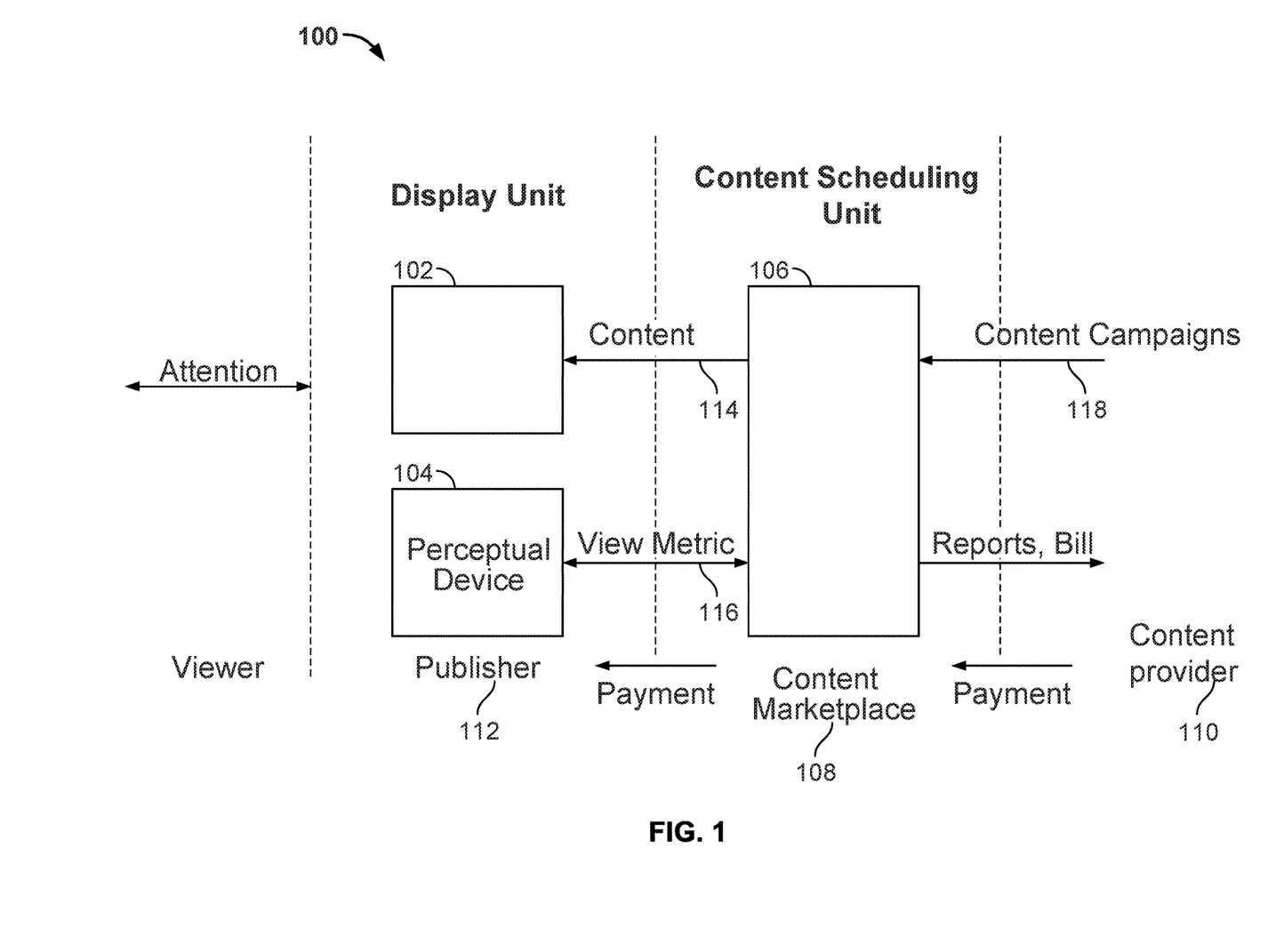
FIG. 1 is a block diagram of a computing system that can be used for content presentation based on realtime information.

FIG. 1 is a block diagram of a computing system 100 that can be used for content presentation based on realtime information. In some implementations, an interactive system 100 includes a display for content 102, a perceptual device 104 capable of assessing the viewer(s), and a content scheduling unit 106, interacting through connecting network and logic. In some implementations, the content scheduling unit 106 can be considered part of a content marketplace 108 that serves to facilitate connections and transactions between one or more content providers 110 and one or more publishers 112. For example, the system 100 can be used to run a two-sided auction over a computing infrastructure. In some implementations, one or more other allocation processes than an auction can be used.

The display unit 102 can include, but is not limited to, a general purpose computer screen, standalone LCD screen, projector or specialized units such as electronic photo albums, and/or any other suitable display. In some implementations, a device that delivers at least one other media type is used instead of, or with, the display unit 102. For example, a speaker can be used.

The perceptual device 104 can include, but is not limited to, video cameras (e.g., attached to the display unit), cash registers, infrared sensor, sound sensors, etc.

The content scheduling unit 106 can estimate properties of the audience with varying levels of accuracy. In some implementations, audience properties of interest are: audience engagement (or audience attention) and action-conversion rate. Publishers may configure these systems with certain checks, and use them to provide information to the content marketplace either in aggregate or raw form, real time or periodically.

The content providers 110 use one or more systems to enter bids and specify other aspects of content campaigns, and to define audiences for one or more of the individual publishers 112.

The content marketplace 108 matches content inventory from the publisher 112 to demand from the content provider 110, delivers content item(s) directly or indirectly, and serves as a clearing house to collect payments from the content providers and make payments to the publishers. The content marketplace may be implemented using one or more publisher networks.

In some implementations, the system 100 provides fine grained feedback based on user's engagement with the content item, such as the response from a camera indicating that a user looked at the content item or made a gesture to interact with it. For example, the system aims to aggregate only viewership or attention statistics across all users for persistent displays.

Some implementations involve systems and techniques by which a content serving organization can determine the actual number of individuals who are present when particular content item is shown or played. For example, a detector is located near the screen or other device that plays the content item, and a presence value is determined in real time based on detection done during the presentation. Such detectors and the outputs they generate are handled in ways so that privacy rights of the individuals are respected. For example, all processing of detected information can be done locally such that only anonymous statistics are reported. Statistics about content presentation can be used to give valuable feedback to the content provider, or to charge for the content presentation, to name two examples.

The following are examples regarding implementations:

(1) The publisher 112 uses a programmable electronic photo album as the display unit 102 and a mounted camera as the perceptual device 104. The publisher schedules one or more content items 114 to appear on the photo album and the content scheduling unit 106 therefore provides the content item(s) in time for presentation. One or more view metrics 116 can be gathered regarding the content presentation. For example, the number of persons present in the vicinity of the display unit 102 can be provided to the content scheduling unit 106.

(2) In public spaces, the display unit 102 is a projector and the perceptual device 104 includes a mirror/camera apparatus. This allows for the deployment of the system in public places where the device itself may be subject to vandalism or theft (e.g., a subway). In some implementations, one or more of the display units 102 can be situated at locations that do not have the perceptual device(s) 104.

(3) In order to communicate between the unit and the marketplace, a variety of protocols may be used, such as: 3G, SMS, ethernet, DSL, wifi, bluetooth, or ad-hoc networks of units. The communication is appropriately secured against unauthorized interception and manipulation. For example, encoding by HTTPS can be used.

(4) In commercial spaces display unit 102 may be a touchscreen LCD. In this setting the perceptual unit can be comprised of a camera as well as the touchscreen display. For example, this device allows for interactive programming to be shown, such as dynamic advertisements where viewers can interact with the screen to learn more about specific products being advertised.

(5) The display unit 102 can be a small LCD display hosted at credit card terminals, cash registers, or checkout counters. For example, in this setting an enhanced credit card reader could serve as the display unit 102 as well. The publishers can present personalized advertisements or other content on the display unit 102 based on store loyalty card (or credit card) information.

(6) The display unit 102 includes multiple physical displays and mounted cameras which are synchronized to provide an enhanced content experience. For example, a single publisher can own multiple electronic billboards positioned along a highway. The publisher can ensure that an entire series of content items is seen by drivers by temporally displaying content items across the billboards according to typical traffic patterns.

A camera serving as the perceptual device 104 can be used to estimate whether a content item was looked at for significant amount of time or not, e.g., to calculate "quality" of the content item. This may be provided as a report to the content providers.

Content may be sold and priced via an auction or other allocation process in which content providers only pay if the users looked at the content item and/or interacted with it. For example, this determination can be done based on detecting gestures from camera output. Then, the "quality" of a content item can be used in a bid mechanism, for example an auction. For example, the content provider 110 generates one or more content campaigns 118 in the content scheduling unit, the content campaign including at least one bid that takes into account realtime information about the content presentation.

In some implementations, the camera may be used to calculate the number of people who view or are in the vicinity of the display unit per unit of time, and content providers can specify that their content be shown only in places with a certain flow rate of people. Thus, the quality can be used in the bidding for content campaigns.

In some implementations, the content provider can make a realtime decision regarding how to bid. The detected attendance information can be provided to content providers in real time. For example, a message of suitable format is sent for receipt by the respective content providers' computer system. The message can be formulated using XML, to name just one example. At the content provider system(s), a bidding engine processes the received information to decide whether to make a bid. For example, the received information can indicate the number of people in attendance, how many of them are actively paying attention to content, the physical location where content items are being presented, and/or other information regarding the content presentation. The content provider's system can then apply the received information to one or more criteria and use the result to formulate one or more bids. For example, the system formulates a bid for displaying an ad, wherein the bid includes a bonus bid amount if the attendance remains at least equal throughout the ad presentation. If the attendance decreases while the ad is being shown, the bid can specify another bid amount. In some situations, the content provider system can decide not to bid on content presentation based on the received information. The bids from the content providers who choose to respond are collected and used in selecting one or more winning bids for presenting content.

Figure 2:
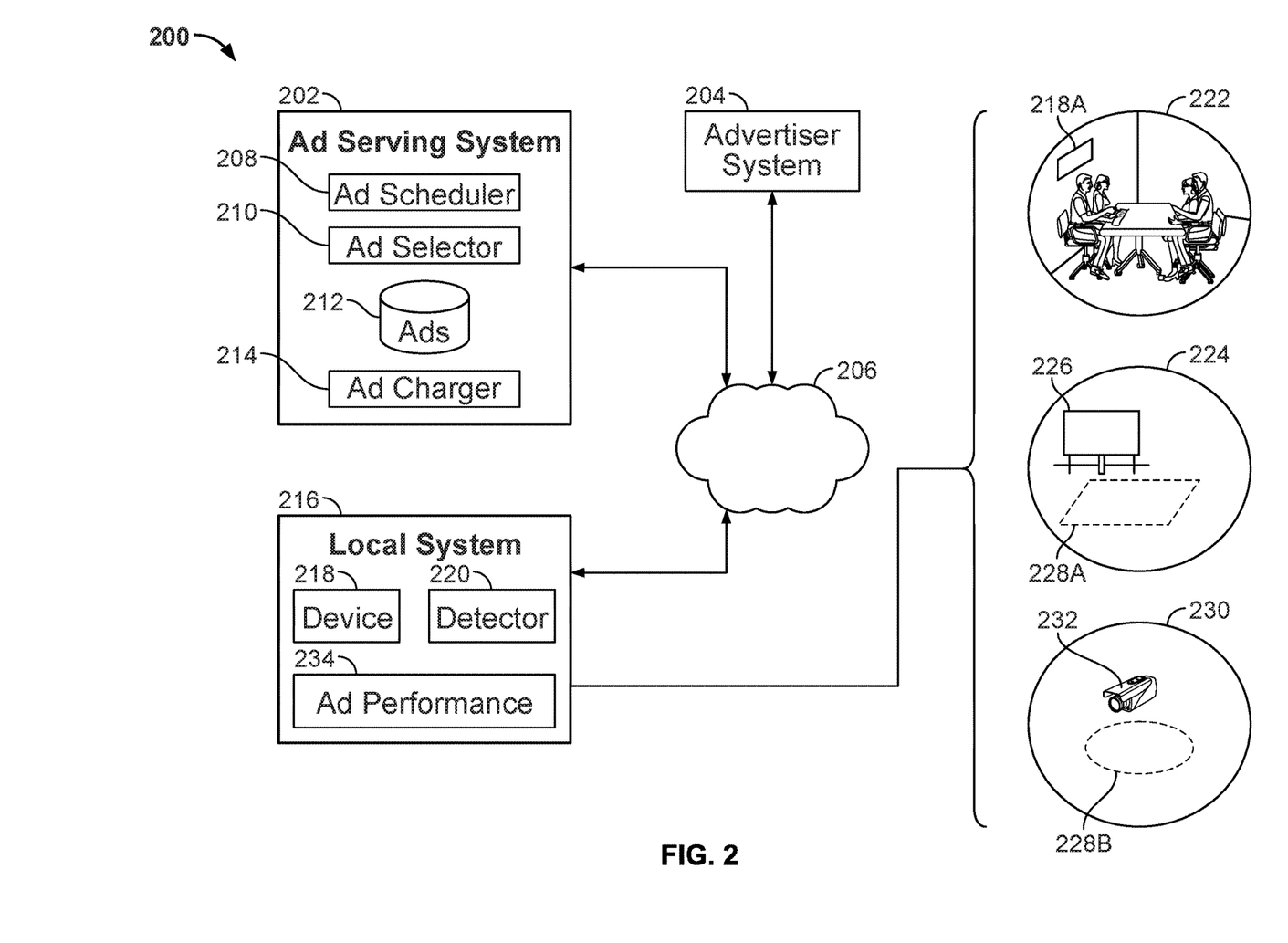
FIG. 2 shows a system that can be used for gathering data about ad presentation.

FIG. 2 shows a system 200 that can be used for gathering data about ad presentation. The system 200 here includes an ad serving system 202 that is configured to manage advertising on behalf of one or more advertisers. The system 200 can include one or more advertiser systems 204 that can communicate with the ad serving system 202 and/or with other systems through any kind of network 206, for example the Internet.

Particularly, the ad serving system 202 includes an ad scheduler module 208 with which the advertiser can interact to schedule presentation for one or more ads. In some implementations, the ad scheduler module 208 runs an auction or other bidding process where multiple advertisers are eligible to bid for the opportunity to have their ad(s) presented. Available ad slots can be defined with regard to time—such as a 30-second ad spot on TV—or with regard to space—such as a subsection of an electronic display, or both, to name just a few examples.

The ad serving system 202 includes an ad selector module 210 that is configured for selecting one or more candidate ads for any given ad slot. The ad selector module can perform the selection based on keyword matching, or context matching, or both, to name just a few examples. The ads are stored in an ads repository 212, for example in form of individual files of video, graphics, text, or audio content. Each ad in the ad repository 212 can be assigned a unique ad identifier, such as a string of letters and/or numbers, to name just a few examples.

The ad serving system 202 includes an ad charger module 214 that is configured for determining the applicable charge payable by the advertiser whose ad was presented. As will be described in examples below, the ad charger module 214 can access information about actual presence that was detected while the ad was presented, and can use this information in calculating the charge.

A local system 216 is one of the multiple places where an ad will be presented to one or more individuals. The system 200 can include any number of the local system 216, and they can be located in any suitable geographic locations. The local system includes at least one device 218 for presenting the ad. In some implementations, the device 218 can include a display device, a TV, a projector, a handheld device, a speaker, headphones, and combinations thereof, to name just a few examples.

The local system 216 here includes at least one detector 220 that will detect a presence of one or more individuals when the ad is being presented. The detector 218 can include one or more of an optical sensor, a tactile sensor, a heat sensor, a camera, an acoustic sensor, a speech detector, a pressure sensor, a temperature sensor, a motion sensor, a humidity sensor, and combinations thereof, to name just a few examples. In some implementations, one or more local systems 216 do not have a detector 220.

Some implementations of the local system 216 will now be described to exemplify different forms of detection. As a first example, the local system 216 can be implemented in a room 222, for example a conference room, a meeting room, an office or any other room. Here, the local system includes a display device 218A, such as a TV, that is visible to those present in the room. For example, the display device 218A is being used in a videoconference call between the persons in the room 222 and somebody at a different location. In connection with the videoconference call, one or more ads are presented on the display device 218A, and the detector 220 detects the persons as being physically present in the room 222 when the ad is presented. That is, whichever type of detector is used, its output is used by the local system 216 and/or the ad serving system 202, to learn the number of individuals to whom the ad was presented.

In some situations, the same number of present individuals is detected as being present throughout the entire duration of the ad. In other situations, one or more persons leave or enter the room 222 during the ad presentation. In some implementations, the local system 216 can determine an average number for the presence.

In some implementations, the detector 220 and/or the local system 216 can determine whether each of the present persons is observing the display device 218A. For example, the detector 220 can include a camera that captures still images and/or video of the room 222. Image recognition techniques can be used with such image content to recognize the shapes of individuals in the room, for example based on heads, arms or legs. In some implementations, the recognition technique can determine whether the person's head was facing the display device 218A for the entire duration of the ad, or for just a part thereof. For example, if one person was found to be turned away from the display device 218A during about half of the ad, this may be counted as only half a presence compared to a steady viewer, or it may be counted as no presence at all.

In the detection of individual presence(s), privacy rights are respected. For example, privacy policies regarding how information is collected and/or used can be created and enforced. In some implementations, the identities of users are protected by use of one or more anonymization processes. In some implementations, certain information associated with users is anonymized or partially redacted. For example, when a camera is used for detecting presence, the image or images are processed to block, blur or mask a person's face or other recognizable characteristics.

When the local system 216 or part thereof is used in a private or semi-private environment, privacy protection can extend also to the device(s) being used and the information they hold. For example, device history and address association can be anonymized by use of collision-resistant hashes that hash the identification data. For example, user identities (such as user names or user electronic mail addresses) can be replaced in whole or in part with a numerical string; user Internet Protocol addresses can be processed to eliminate some information such as, for example, the class C and class D subdomain information; user browsing history can be disassociated with a particular user identity and replaced with a user interest category; and user interest categories can be generalized to minimize association with specific user identities or user browsing histories, and the like. Additional privacy protection techniques can also be used, such as the use of one or more encryption processes.

As a second example, the local system 216 can be implemented in a public area 224. The public area is provided with an electronic billboard 126 on which the ad is presented. The electronic billboard can be updated from time to time to show another ad, or some other type of content. The detector 218 here senses the presence of one or more individuals in at least one location 228A, such as within a predefined area.

As a third example, the local system 216 can be implemented in an area 230 where an existing surveillance device 232 is operating. In some implementations, the surveillance device 232 is a camera capturing images, video and/or audio of a specific location 228B, such as within a predefined area. For example, the surveillance device 232 has previously been installed to monitor the specific location 228B for security purposes. When the local system 216 is installed in the area 230, the surveillance device 232 can for example serve the role that the detector 220 did in the above descriptions. The device 218, in turn, can be installed or placed in the vicinity of the specific location 228B.

The information recorded by the surveillance device 232 is captured and used to generate ad presentation data. In some implementations, the captured information includes one or more images that are processed to determine the number of individuals present at the specific location 228B. The local system 216 can receive a feed from the surveillance device 232, and can either process the content locally or forward some or all thereof to the ad serving system 202. A timestamp or other chronological reference can be used to ensure that the determined number is assigned to the correct ad.

Some specific examples of the specific locations 228A-B will now be described, without limitation. When the electronic billboard 226 is placed roadside, the locations 228A-B can include a portion of the road from which the electronic billboard is visible. The detector 218 can sense presence by detecting each vehicle on that portion of the road. The detection can be done visually by a motion detector, by audio using a microphone, or by a pressure-sensitive strip embedded in the road surface, to name just a few examples. As another example, the locations 228A-B can include a street, and the detector 220 then detects for example vehicles passing by the electronic billboard.

The locations 228A-B can include a sidewalk or public square, and the detector 220 then for example detects people passing by a storefront window or other location where the ad is displayed. Detection can be done visually, optically or by pressure, for example.

The locations 228A-B can include a park or a part thereof, and the detector then for example detects the number of individuals present near a park entrance or gift shop where the electronic billboard 226 presents the ad in connection with other content, such as information about the park.

The locations 228A-B can include a theater or a sports venue, and the detector then for example detects the number of individuals present at the event.

The locations 228A-B can include a public transportation vehicle, for example a taxicab, a bus, a subway car, a train or an airplane, and the detector then detects the number of passengers present when the ad is presented.

The locations 228A-B can include a parking lot or a garage, and the detector then detects the number of cars and/or individuals who are present when the ad is presented.

Other locations where individual presence is detectable can be used.

The local system 216 includes an ad performance module 234 that can perform some or all processing to determine the number of individuals present when the ad was being presented.

Figure 3:
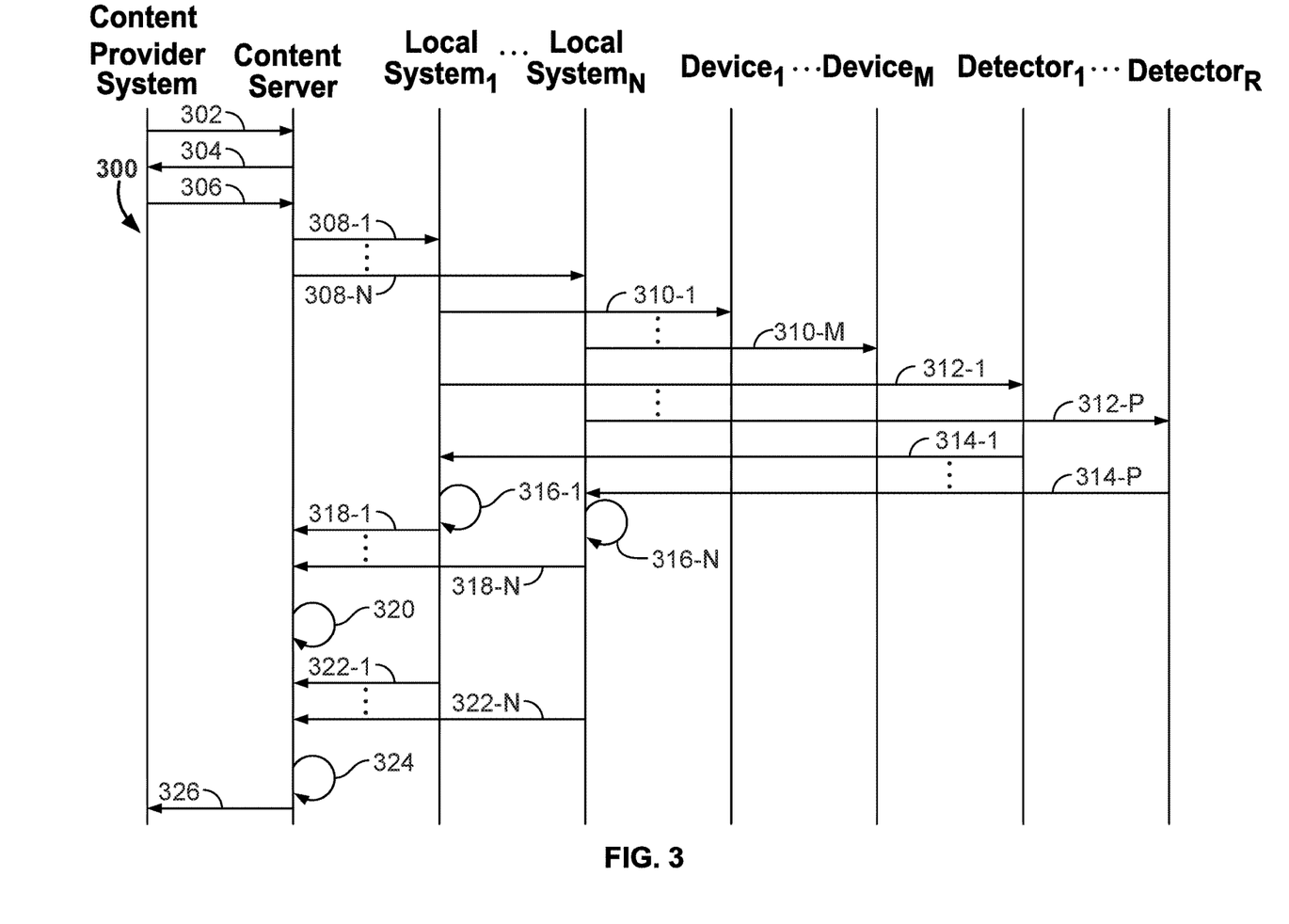
FIG. 3 shows a diagram that illustrates operations in gathering data about content presentation.

FIG. 3 shows a diagram 300 that illustrates operations in gathering data about content presentation. The operations can be implemented and performed in any system having one or more processors, for example in the system 200 shown in FIG. 2, and components of that system will be referenced below as examples. At 302, one or more content provider systems contact a content server system for the purpose of securing space for one or more content items. For example, the advertiser system 204 participates in an ad bidding process run by the ad serving system 202 for the opportunity to display one or more ads.

At 304, the content server confirms the presentation right to the content provider system. For example, the ad serving system 202 notifies the advertiser system 204 that the corresponding advertiser won the bidding for an ad slot or other advertising space.

At 306, the content provider system can forward at least the content item(s) that are to be presented to the content server. For example, the advertiser system 204 forwards a file with image, audio and/or text content to the ad serving system 202 for storage in the ads repository 212. As another example, the advertiser system 204 sends the ad serving system 202 a link or other identifier for locating the ad(s) in the ads repository 212, and the ad serving system 202 can then direct one or more local systems to retrieve the ad(s). In some implementations, the operation 306 is performed together, or in connection, with the operation 302. As another example, the content server can receive the content item from another entity that acts on behalf of the content provider, or create the content on behalf of the content provider.

At some predefined or selected time, the content server will prompt at least one device to present the content item(s). In some implementations, the content is scheduled to be presented on a network of TV sets associated with the ad server system 202. The presentation can be done using a set top box, smart TV, handheld device and/or personal computer, to name just a few examples. In this example, it is assumed that N local systems are to participate in this content presentation, and they are therefore referred to as Local System$_1$ through Local System$_N$, respectively. Accordingly, at operations 308-1 through 308-N, the content server prompts each respective local system to present the content. For example, the content server forwards the content to the local system, or sends the local system information, such as a re-direct command, about where to retrieve the content. In some implementations, other information is also forwarded, such as any metadata about the content item(s).

Any of the operations 308-1 through 308-N can be performed ahead of time, in which case the respective local system buffers or caches or otherwise stores the content item(s) in the meantime. As another example, any of the operations 308-1 through 308-N can be performed substantially in real time with content presentation, such that the content server prompts the corresponding local system essentially at the intended presentation time.

Each local system includes one or more devices for presenting the content item(s). For example, the local system 216 includes the device 218. In this example, it is assumed that a total of M devices are included in the local systems, and they are therefore referred to as Device$_1$ through Device$_M$, respectively. Accordingly, at operations 310-1 through 310-M, each of the local systems forwards at least the content item(s) to the respective device(s).

Each local system 216 may be associated with one or more detectors for sensing presence of individuals during content presentation. For example, the local system 216 includes the detector 220, and/or is associated with the existing surveillance device 232. In this example, it is assumed that a total of P detectors are present for the local systems, and they are therefore referred to as Detector$_1$ through Detector$_P$, respectively, where P can be smaller than, equal to, or larger than M. At operations 312-1 through 312-P, each of the local systems can trigger the respective detector(s). In some implementations, detectors run continuously or at specified times without prompting, and one or more of the operations 312-1 through 312-P are then omitted. In implementations where one or more local systems do not have a detector, content items are provided to those local systems as well, in the operations 308-1 through 308-N described above.

In some implementations, output from each of the detectors is provided to the respective local system. For example, each detector forwards at least part of its generated output to the corresponding local system at operations 314-1 through 314-P. The received outputs can be processed by the respective local systems in operations 316-1 through 316-N. For example, the ad performance module 234 determines the number of individuals who were present during the ad presentation. At operations 318-1 through 318-N, each local system can forward a message to the content server with at least one presence value for each respective content presentation.

As noted earlier, such presence values are de-personalized or otherwise anonymized as appropriate. The presence values are assigned to the corresponding content using the content identifier. At 320, the content server can generate the following presence-value accumulation, for example:

TABLE 1

| Location | Presence Value | Presence Criterion | Presence Factor |
|---|---|---|---|
| Local System$_1$ | 0 | Criterion$_1$ | Factor$_1$ |
| Local System$_2$ | 5 | Criterion$_2$ | Factor$_2$ |
| . | | | |
| . | | | |
| Local System$_{N-1}$ | — | Criterion$_{N-1}$ | Factor$_{N-1}$ |
| Local System$_N$ | 3 | Criterion$_N$ | Factor$_N$ |

Table 1 shows example presence values for some of the local systems. That is, five individuals were detected as present at Local System$_2$, for example. Regarding Local System$_{N-1}$, by contrast, no presence value has been received. This can be due to any of multiple reasons including, but not limited to: the content was not presented; the detector malfunctioned; or the detector output was inconclusive.

The presence-value accumulation can indicate at least one presence criterion and/or a presence factor for some or all of the presence values. The presence criterion reflects the threshold that was applied to count an individual as present and can be specific to the particular type of detector. For example, a criterion specifies that an individual must be detected during at least a certain fraction, or a specific part, of the presentation to be counted as present. As another example, the criterion specifies that each output generated by a pressure sensor embedded in a roadway is counted. As yet another example, a criterion specifies a recognition technique applied to an image, video or audio file. Other criteria can be used.

The presence factor reflects an estimated relative significance of the respective presence value. In some implementations, the detection of a person as present in a conference room during content presentation is considered more significant than the detection of one vehicle passing by a highway billboard. For example, the conference-room attendee gets a high numerical weight and the highway traveler a low numerical weight.

The presence-value accumulation for a specified content item is an example of content presentation data that is generated using the presence values. Another example of content presentation data is any form of generated statement that indicates how many individuals were detected as present while a specified content item was played.

In other implementations, information processing is done by another system than the corresponding local system (e.g., by the ad serving system 202). Accordingly, one or more of the detectors can instead forward output directly to such other system(s) in operations 322-1 through 322-N. For example, the forwarded output can include the entire output that the local system received from the detector(s), or a portion thereof. The content server then processes such received output at 324 to determine presence values.

At 326, the content server generates one or more messages to the content provider system. In some implementations, the content server calculates a charge for the content presentation based on the presence values, and communicates this amount to the content provider. For example, the ad charger module 214 calculates a fee by multiplying the sum of the presence values with a specific rate, optionally taking into account the presence factors. In some implementations, the content server creates feedback to the content provider about the content item's performance, for example to report the actual presence value or a generalization thereof. Accordingly, such invoice or other communication to the content provider is another example of content presentation data that is generated using the presence values.

Any or all of the operations can be performed multiple times. For example, the operations 302-326 are repeated with every content presentation in the network.

Figure 4:
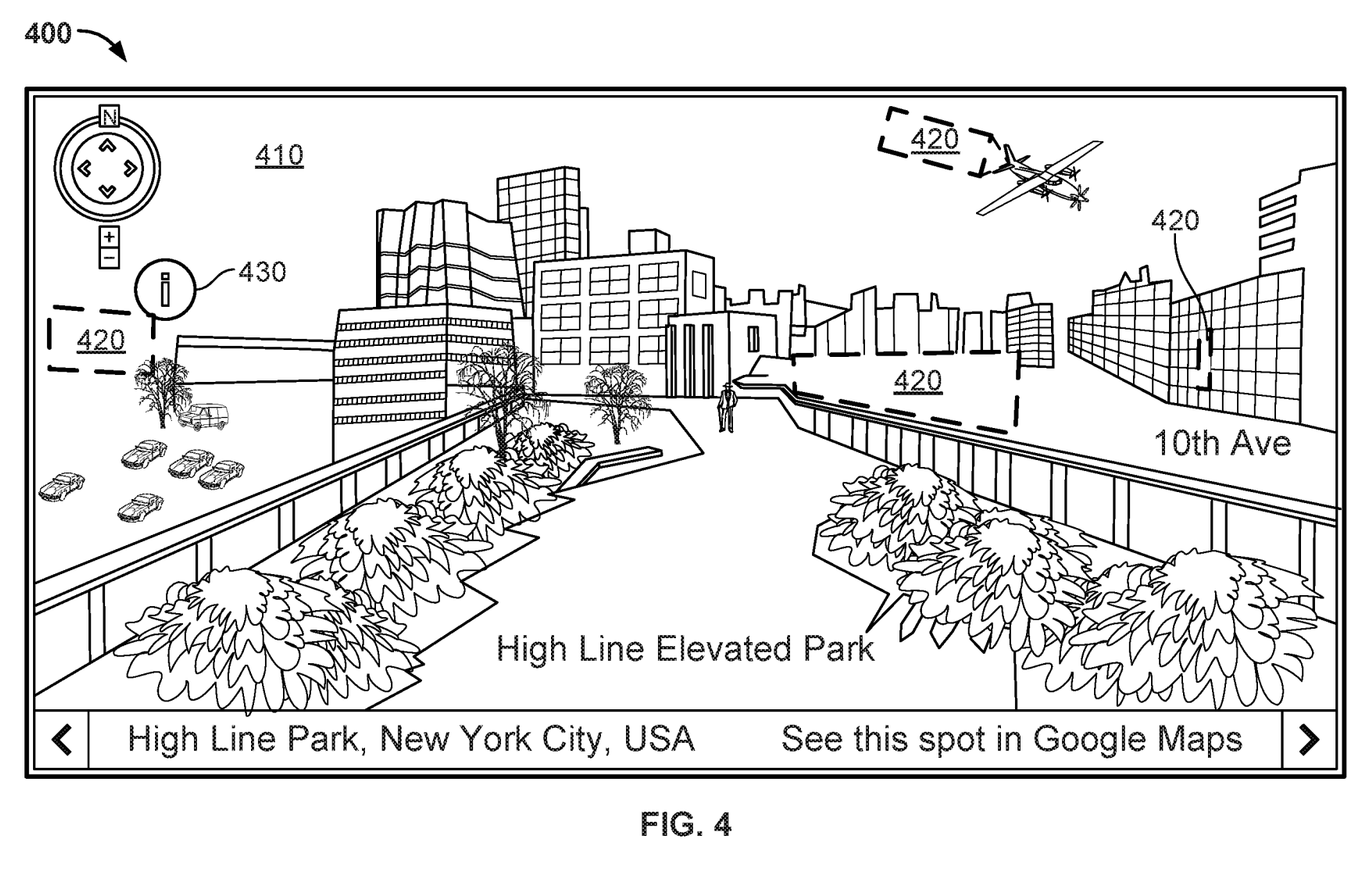
FIG. 4 shows an example content provider display regarding content locations.

FIG. 4 shows an example content provider display 400 regarding content locations. In some implementations, the content provider display 400 is presented to one or more content providers to facilitate bidding and/or other decision-making regarding content. For example, the content provider display 400 can provide the content provider a 2D or 3D walkthrough of one or more content locations in a geographic area, enhanced with realtime attendance information.

The content provider display 400 includes a location area 410 presenting a view of a geographic region. In some implementations, the location area 410 is or includes a photograph, map, satellite image, 3D model, and/or any other suitable representation of the geographic region. For example, the location area 410 can include imagery from the Street View feature of Google Maps, available from Google Inc. Here, the location area 410 shows a picture of an urban environment with streets, buildings, walkways, vehicles and other objects.

The location area 410 here includes content locations 420 indicated in the urban environment. In some implementations, the content locations 420 correspond to content inventory that may be available for purchase or rental. For example, the content locations 420 here include billboards that face streets, buildings and/or parking lots, billboards mounted on the side of buildings, and an aerial advertisement on a banner towed by an airplane. Other content locations can be used in some implementations.

The content locations 420 correspond to any suitable medium of advertising. Without limitation, content can be presented using: LED, LCD or plasma screen, television screen, speaker, tactile display, printed paper or other backing, ink or other pigment applied to an object, makeup, visual gestures, and combinations thereof, to name just a few examples.

Realtime information may be associated with one or more of the content locations 420. In some implementations, the user can click on a symbol 430 to access information about one or more content locations. For example, each of the content locations 420 in the location area 410 may be provided with, or may constitute, the symbol 430. In some implementations, realtime data and/or other information about content locations is displayed directly in the location area 410 or elsewhere in the content provider display 400.

Figure 5:
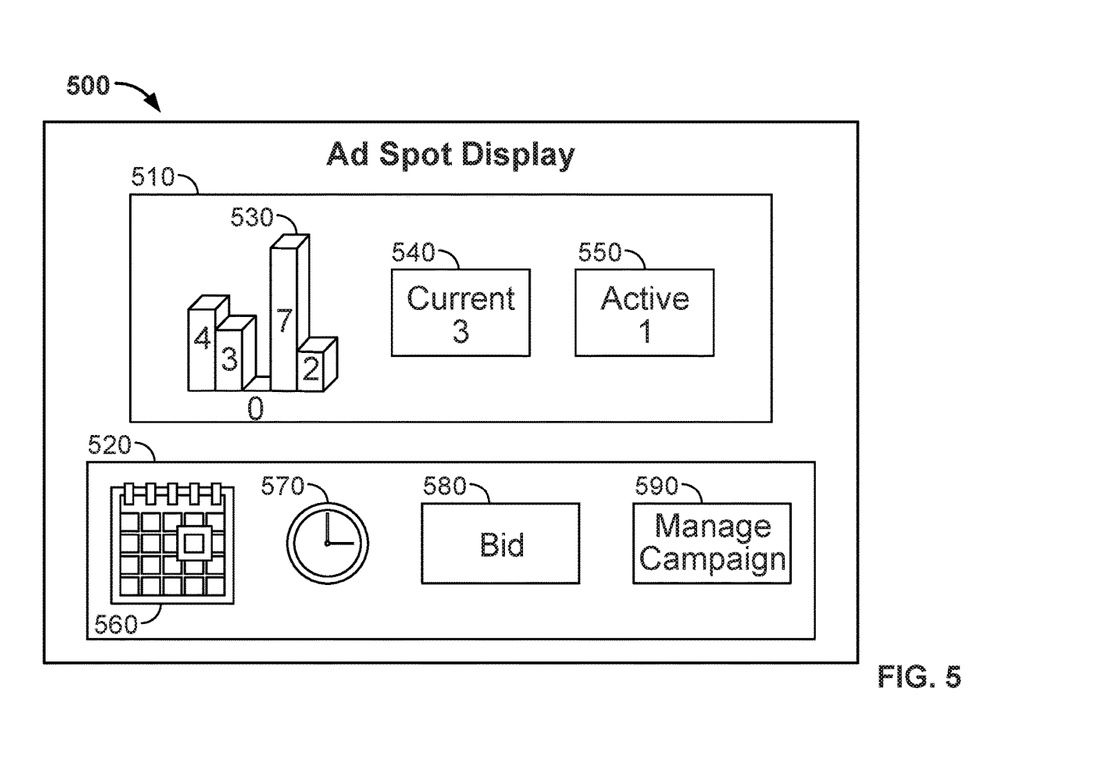
FIG. 5 shows an example advertiser display regarding ad locations.

FIG. 5 shows an example advertiser display 500 regarding ad locations. The advertiser display 500 can be displayed when the symbol 430 (FIG. 4) is clicked, and/or can be integrated into the content provider display 400 (FIG. 4). The advertiser display 500 here includes an attendance information area 510 and a bidding area 520.

The attendance information area 510 includes attendance history 530 that shows one or more statistical visualizations of attendance data for the particular ad location. In some implementations, the attendance history 530 indicates the detected attendance(s) in an arbitrary unit of time. For example, the daily attendance or the attendance during the time of traffic rush hour can be shown. Any suitable diagram or graph can be used.

The attendance information area 510 includes current attendance data 540 that reflects the realtime data, or the most current available data, regarding attendance at the ad location. This information can be useful if a prospective advertiser is doing a virtual walkthrough of multiple ad locations. For example, the current attendance data 540 can then indicate to the advertiser what reach an ad campaign might have depending on the particular time, day, week or month the ad is presented. Here, the current attendance data 540 indicates that three people are currently in attendance by the as presentation device.

The attendance information area 510 includes attendance characteristic data 550 that indicates one or more characteristics of the detected attendance. For example, attendance characteristic data 550 can specify how many of the attending persons are watching the ad (e.g., those having their faces turned toward the ad presentation device), and/or the average amount of time that each attending person has been present. Here, the attendance characteristic data 550 indicates that one of the attending people is actively watching the ad presentation device.

The system protects the privacy of those whose presence is detected, and ensures that personal or other sensitive information is obscured or deleted. For example, the attendance information area 510 contains only information that cannot be traced to, or otherwise associated with, any particular individual. Also, the data regarding detected attendance is communicated using encryption and/or other security measures.

The bidding area 520 includes a calendar function 560 and a time function 570 for specifying one or more bids. In some implementations, the advertiser can bid for presentation of the ad over one or more days (e.g., using the calendar function) or over one or more time periods (e.g., using the time function). For example, when the advertiser specifies a day or time, the attendance history 530 can be updated to show relevant historical information.

The bidding area 520 includes a bid function 580 for the advertiser to specify monetary amounts and/or other information regarding bids. The bid that the advertiser makes using this function can automatically be applied to a currently selected ad location, or the advertiser can explicitly specify one or more ad locations of interest, to name just two examples. In some implementations, the advertiser can condition the bid on one or more attendance characteristics. For example, the advertiser can specify that the bid is valid only if the attendance at the ad presentation device reaches at least a minimum amount (e.g., measured by the current attendance data 540), and/or that at least a certain number of people are paying attention to the ad presentation device (e.g., measure by the attendance characteristic data 550). That is, the detected attendance data can be used as a trigger for ad presentation.

In some implementations, the content provider can condition payment for content presentation on realtime attendance information in one or more ways. For example, the content provider can specify that the attendance must remain above some minimum level while the content provider's ad is being shown, or else the content provider pays only a reduced fee or no fee at all. That is, in this example, the content selection may be triggered by one set of detected attendance data (e.g., data regarding the most recently presented content), and content payment or any other subsequent action can be dependent on another set of attendance data, namely the attendance during the presentation of the content that the bid relates to.

The bidding area 520 also includes a manage campaign function 590. In some implementations, the advertiser here specifies which ad(s) to associate with the bid, other conditions or parameters for the ad presentation (e.g., a maximum budget), and/or extend the ad campaign to cover one or more new ad locations. For example, an advertiser who has reviewed the attendance history 530 for one or more of the ad locations 420 (FIG. 4) decides to place an ad in the location(s).

In some implementations, one or more aspects of the advertiser display 500 are integrated into the content provider display 400 (FIG. 4). For example, the attendance history 530, current attendance data 540 and/or the attendance characteristic data 550 can be shown within or in association with each of the ad locations 420 (FIG. 4).

Figure 6:
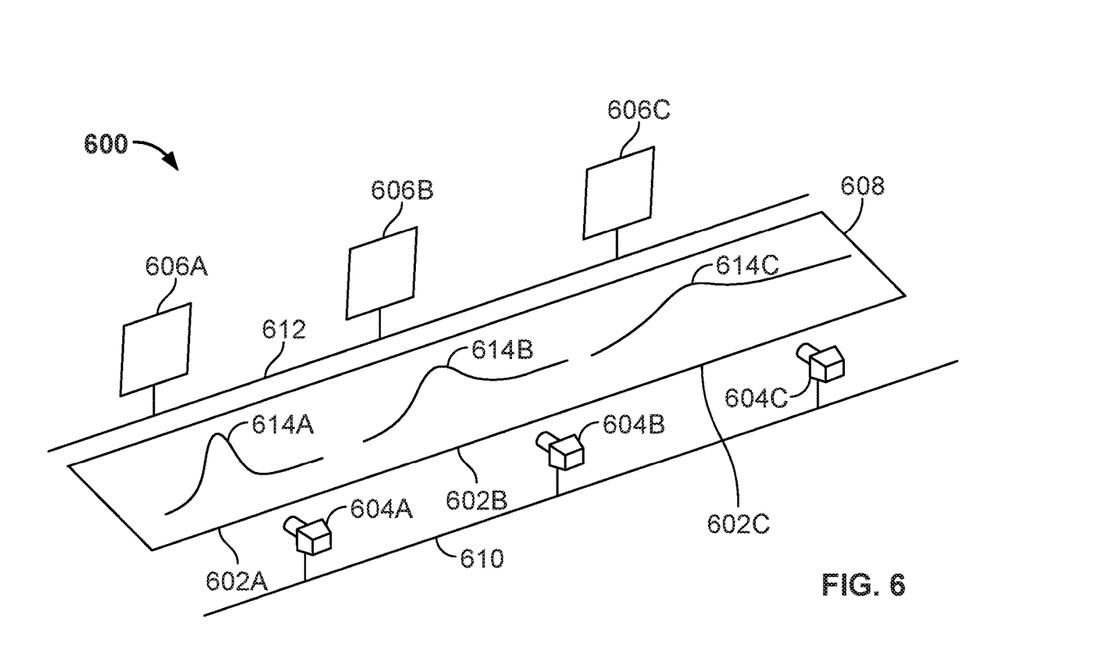
FIG. 6 schematically shows an environment with physical locations, perceptual devices, and content presentation devices.

FIG. 6 schematically shows an environment 600 with physical locations 602, perceptual devices 604, and content presentation devices 606. The physical locations 602 can include any suitable geographic area. In some implementations, any physical location described herein (e.g., with regard to FIG. 2) can be used. Here, the physical locations 602 are situated along a way 608. For example, and without limitation, the way 608 can be a sidewalk, a corridor, a skyway, an airport jetway, a walkway, a path, a trail, a canal, a railway track, a street, a highway or a runway.

The perceptual devices 604 can include any device suitable for detecting at least presence of one or more persons at each of the respective physical locations 602. In some implementations, any perceptual device described herein (e.g., with regard to FIG. 2) can be used. Here, the perceptual devices 604 are connected to a network 610. For example, and without limitation, the network 610 is the internet or a local network. In some implementations, one or more of the physical locations 602 have the content presentation device(s) 606 but do not have any perceptual device 604.

The content presentation devices 606 can include any device suitable for presenting a content item to one or more persons. In some implementations, any content presentation device described herein (e.g., with regard to FIG. 2) can be used. Here, the content presentation devices 606 include electronic billboards or other electronic signs connected using a network 612. For example, and without limitation, the network 612 is the internet or a local network.

Attendance information 614 is generated in the environment 600 and used for one or more purposes. For example, content presentation can be triggered and/or otherwise dependent on (e.g., in terms of the price to pay) the detected attendance.

In some implementations, the environment 600 allows for optimization of content presentation. Assume here that traffic flows along the way 608 in the general direction from the physical location 602A via the physical location 602B toward the physical location 602C. For example, this can be the case when the way 608 is a one-way corridor (i.e., with foot traffic) or a highway (i.e., with vehicle traffic).

In this example, the perceptual device 604A detects the attendance information 614A regarding the physical location 602A. Particularly, the attendance information 614A here shows a relatively sharp spike in attendance. For example, this local peak in the attendance data can correlate with morning rush hour traffic on a highway, or with a group of passengers who are proceeding toward an airplane terminal along a designated walkway.

Based on the attendance information 614A one or more content items are selected and presented on the content presentation device 606A. More particularly, the selected content here includes a sequence of messages intended to be read or otherwise perceived in order. Therefore, the selection of one content item for the ad presentation device 606A here signifies that the other messages will subsequently be presented on the other content presentation devices.

Continuing this example, the perceptual device 604B detects the attendance information 614B regarding the physical location 602B, and one or more content items are selected and presented on the content presentation device 606B. The perceptual device 604C, in turn, detects the attendance information 614C regarding the physical location 602C, and one or more content items are selected and presented on the content presentation device 606C. That is, the detection of the attendance information 614A-C here allows the content provider to properly time the display of related content (or content items) along the way 608.

Figure 7:
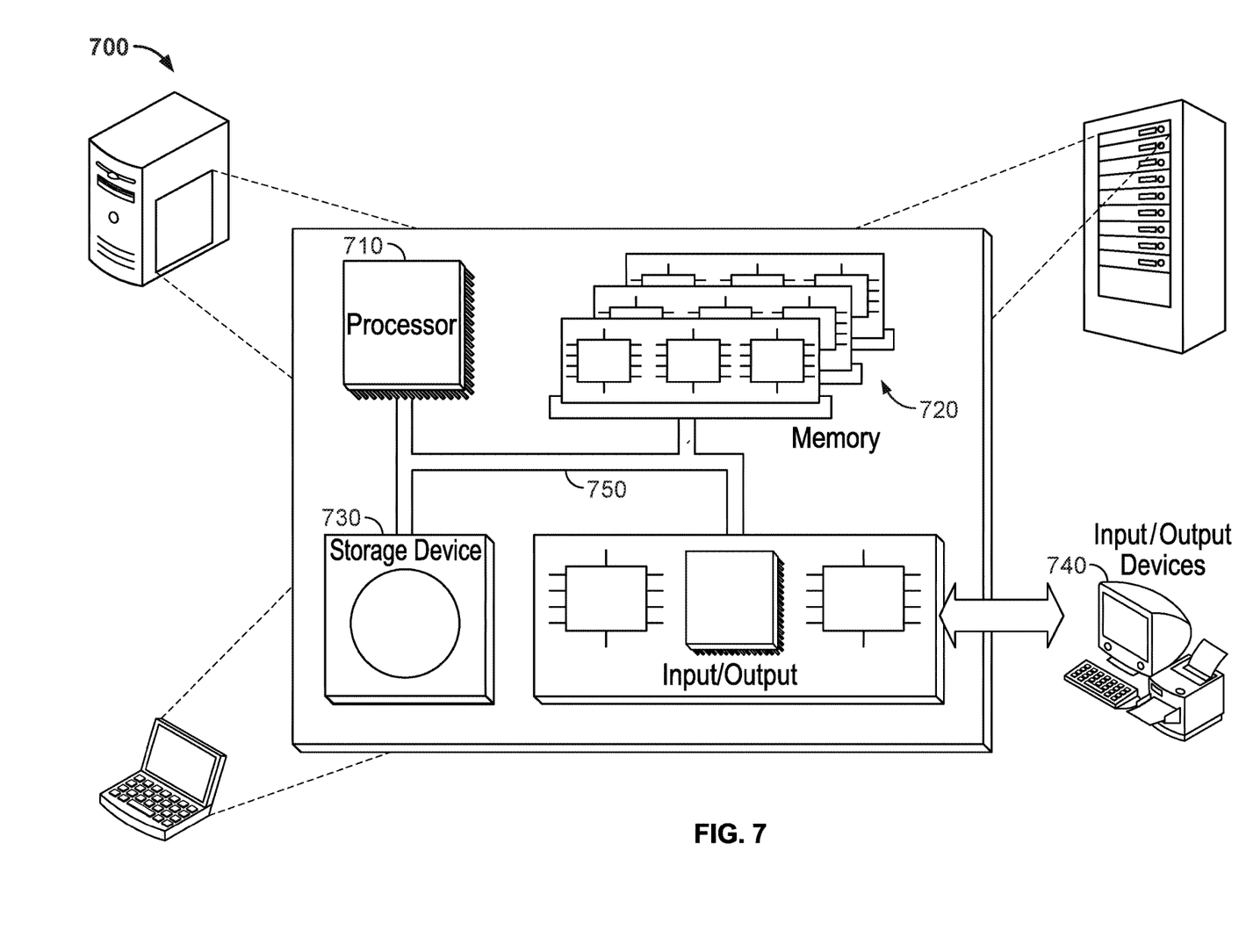
FIG. 7 is a block diagram of a computing system that can be used in connection with computer-implemented methods described in this document Like reference symbols in the various drawings indicate like elements.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
providing a content item for presentation on a presentation device responsive to a winning bid submitted by the provider of the content item specifying an initial amount required for presentation of the content item;
after providing the content item for presentation on the presentation device:
obtaining sensor data generated by a sensor during presentation of the content item on the presentation device, the sensor located in a same physical environment as the presentation device, the sensor data indicating information about a viewing audience that was located in the physical environment of the presentation device during presentation of the content item on the presentation device;
determining, based on the sensor data, a size of the viewing audience that was located in the physical environment of the presentation device during presentation of the content item on the presentation device; and
adjusting an amount charged to a provider of the content item for presentation of the content item based on the determined size of the viewing audience that was located in the physical environment of the presentation device during presentation of the content item on the presentation device, by decreasing the initial amount specified by the winning bid based on the sensor data indicating that the size of the viewing audience decreased during presentation of the content item on the presentation device.

2. The computer-implemented method of claim 1, wherein determining the size of the viewing audience that was located in the physical environment of the presentation device during presentation of the content item on the presentation device includes determining a number of viewers who remained in a viewing vicinity of the presentation device until a specified amount of the presentation of the content item completed.

3. The computer-implemented method of claim 1, further comprising selecting the presentation device from among a plurality of presentation devices located in various physical environments on which to present the content item based on information obtained from co-located sensors in the various physical environments indicating information about viewing audiences located in the various physical environments at times preceding presentation of the content item on the presentation device.

4. The computer-implemented method of claim 3, further comprising selecting the presentation device from among the plurality of presentation devices located in the various physical environments on which to present the content item based on information about local attendance peaks at the various physical environments.

5. The computer-implemented method of claim 1, wherein a second presentation device located in a second physical environment has no corresponding sensor available to monitor capture information about a viewing audience located in the second physical environment;
the method further comprising providing the content item for presentation also on the second presentation device in the second physical environment.

6. The computer-implemented method of claim 1, wherein the sensor located in the same physical environment as the presentation device comprises at least one of an optical sensor, a tactile sensor, a heat sensor, a camera, an acoustic sensor, a speech detector, a pressure sensor, a temperature sensor, a motion sensor, or a humidity sensor.

7. The computer-implemented method of claim 1, wherein the presentation device is a billboard, and the sensor comprises at least one of an acoustic sensor, a pressure sensor, or a motion sensor that detects audio, pressure, or visual signals, respectively, indicating information about a number of vehicles traveling on a street in proximity of the billboard.

8. The computer-implemented method of claim 1, wherein:
the sensor comprises a camera configured to capture images of viewers within a viewing vicinity of the presentation device; and
determining the size of the viewing audience that was located in the physical environment of the presentation device during presentation of the content item on the presentation device comprises performing an image recognition process on at least one image captured by the camera during presentation of the content item to count a number of viewers that the at least one image shows were located in the viewing vicinity of the presentation device during presentation of the content item.

9. The computer-implemented method of claim 1, wherein:
adjusting the amount charged to the provider of the content item for presentation of the content item comprises adding a bonus to the initial amount specified by the winning bid based on the sensor data indicating that the size of the viewing audience meets a threshold viewership size.

10. One or more non-transitory computer-readable media having instructions stored thereon that, when executed by one or more processors, cause performance of operations comprising:
providing a content item for presentation on a presentation device responsive to a winning bid submitted by the provider of the content item specifying an initial amount required for presentation of the content item;
after providing the content item for presentation on the presentation device:
obtaining sensor data generated by a sensor during presentation of the content item on the presentation device, the sensor located in a same physical environment as the presentation device, the sensor data indicating information about a viewing audience that was located in the physical environment of the presentation device during presentation of the content item on the presentation device;
determining, based on the sensor data, a size of the viewing audience that was located in the physical environment of the presentation device during presentation of the content item on the presentation device; and
adjusting an amount charged to a provider of the content item for presentation of the content item based on the determined size of the viewing audience that was located in the physical environment of the presentation device during presentation of the content item on the presentation device, by decreasing the initial amount specified by the winning bid based on the sensor data indicating that the size of the viewing audience decreased during presentation of the content item on the presentation device.

11. The one or more non-transitory computer-readable media of claim 10, wherein determining the size of the viewing audience that was located in the physical environment of the presentation device during presentation of the content item on the presentation device includes determining a number of viewers who remained in a viewing vicinity of the presentation device until a specified amount of the presentation of the content item completed.

12. The one or more non-transitory computer-readable media of claim 10, wherein the operations further comprise selecting the presentation device from among a plurality of presentation devices located in various physical environments on which to present the content item based on information obtained from co-located sensors in the various physical environments indicating information about viewing audiences located in the various physical environments at times preceding presentation of the content item on the presentation device.

13. The one or more non-transitory computer-readable media of claim 12, wherein the operations further comprise selecting the presentation device from among the plurality of presentation devices located in the various physical environments on which to present the content item based on information about local attendance peaks at the various physical environments.

14. The one or more non-transitory computer-readable media of claim 10, wherein a second presentation device located in a second physical environment has no corresponding sensor available to monitor capture information about a viewing audience located in the second physical environment;
the operations further comprising providing the content item for presentation also on the second presentation device in the second physical environment.

15. The one or more non-transitory computer-readable media of claim 10, wherein the sensor located in the same physical environment as the presentation device comprises at least one of an optical sensor, a tactile sensor, a heat sensor, a camera, an acoustic sensor, a speech detector, a pressure sensor, a temperature sensor, a motion sensor, or a humidity sensor.

16. The one or more non-transitory computer-readable media of claim 10, wherein the presentation device is a billboard, and the sensor comprises at least one of an acoustic sensor, a pressure sensor, or a motion sensor that detects audio, pressure, or visual signals, respectively, indicating information about a number of vehicles traveling on a street in proximity of the billboard.

17. The one or more non-transitory computer-readable media of claim 10, wherein:
the sensor comprises a camera configured to capture images of viewers within a viewing vicinity of the presentation device; and
determining the size of the viewing audience that was located in the physical environment of the presentation device during presentation of the content item on the presentation device comprises performing an image recognition process on at least one image captured by the camera during presentation of the content item to count a number of viewers that the at least one image shows were located in the viewing vicinity of the presentation device during presentation of the content item.

18. A system comprising:
one or more processing devices; and
one or more computer-readable media having instructions stored thereon that, when executed by the one or more processing devices, cause the one or more processing devices to perform operations comprising:
providing a content item for presentation on a presentation device responsive to a winning bid submitted by the provider of the content item specifying an initial amount required for presentation of the content item;
after providing the content item for presentation on the presentation device:
obtaining sensor data generated by a sensor during presentation of the content item on the presentation device, the sensor located in a same physical environment as the presentation device, the sensor data indicating information about a viewing audience that was located in the physical environment of the presentation device during presentation of the content item on the presentation device;
determining, based on the sensor data, a size of the viewing audience that was located in the physical environment of the presentation device during presentation of the content item on the presentation device; and
adjusting an amount charged to a provider of the content item for presentation of the content item based on the determined size of the viewing audience that was located in the physical environment of the presentation device during presentation of the content item on the presentation device, by decreasing the initial amount specified by the winning bid based on the sensor data indicating that the size of the viewing audience decreased during presentation of the content item on the presentation device.

19. The system of claim 18, wherein determining the size of the viewing audience that was located in the physical environment of the presentation device during presentation of the content item on the presentation device includes determining a number of viewers who remained in a viewing vicinity of the presentation device until a specified amount of the presentation of the content item completed.

20. The system of claim 18, further comprising selecting the presentation device from among a plurality of presentation devices located in various physical environments on which to present the content item based on information obtained from co-located sensors in the various physical environments indicating information about viewing audiences located in the various physical environments at times preceding presentation of the content item on the presentation device.

* * * * *